United States Patent
Natarajan et al.

(10) Patent No.: US 11,616,373 B2
(45) Date of Patent: Mar. 28, 2023

(54) LOW LATENCY FINE GRAIN SYSTEM-ON-CHIP THROTTLING APPARATUS AND METHOD ON USB TYPE-C PORT

(71) Applicant: Intel Corporation, Santa Clara, CA (US)

(72) Inventors: Udaya Shankar Natarajan, El Dorado Hills, CA (US); Kannappan Rajaraman, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 16/943,941

(22) Filed: Jul. 30, 2020

(65) Prior Publication Data
US 2022/0037899 A1 Feb. 3, 2022

(51) Int. Cl.
*H02J 7/00* (2006.01)
*G06F 1/26* (2006.01)
*G06F 13/42* (2006.01)

(52) U.S. Cl.
CPC ............ *H02J 7/00047* (2020.01); *G06F 1/26* (2013.01); *G06F 13/4282* (2013.01); *H02J 7/00036* (2020.01); *H02J 7/0068* (2013.01)

(58) Field of Classification Search
CPC .. H02J 7/00047; H02J 7/00036; H02J 7/0068; G06F 1/26; G06F 13/4282; G06F 1/266; G06F 1/28; G06F 1/3206; G06F 1/3212; G06F 1/3215; G06F 1/324; G06F 1/3243; G06F 1/3296; G06F 13/385; G06F 13/4081; Y02D 10/00
See application file for complete search history.

(56) References Cited

U.S. PATENT DOCUMENTS

| | | | |
|---|---|---|---|
| 2010/0070659 | A1 | 3/2010 | Ma et al. |
| 2016/0049822 | A1* | 2/2016 | Lee .......................... G06F 1/28 307/66 |
| 2016/0342492 | A1 | 11/2016 | Chen et al. |
| 2020/0142467 | A1 | 5/2020 | Ho et al. |
| 2021/0208648 | A1* | 7/2021 | Venkideswaran ............................ H02J 7/007192 |
| 2021/0382805 | A1* | 12/2021 | Gendler .............. G06F 11/3062 |

OTHER PUBLICATIONS

Extended European Search Report dated Aug. 16, 2021 for EP Application No. 20208471.1, 15 pages.

* cited by examiner

*Primary Examiner* — Stacy Whitmore
(74) *Attorney, Agent, or Firm* — Williamson & Wyatt, P.C.

(57) ABSTRACT

A software and hardware architecture framework utilize the specifications of Universal Serial Bus (USB) Type-C and Power Deliver (PD) to provide fine grain throttling of a processor (e.g., system-on-chip (SoC)). Based on an external charger connection or disconnection, a low latency fine grain power budget loss or gain indication to the processor is delivered. The mechanism of various embodiments is also applicable to connection or disconnection of VBUS powered peripheral devices to the system. The net power loss or gain available to the SoC and System is proportionally used to scale the processor throttling.

20 Claims, 6 Drawing Sheets

LOW LATENCY FINE GRAIN SYSTEM-ON-CHIP THROTTLING APPARATUS AND METHOD ON USB TYPE-C PORT

BACKGROUND

A system-on-chip (SoC) can be throttled for managing platform/system performance. The throttling is based on Thermal Design Power (TDP) and/or SoC junction temperature that trigger control signals to SoC to throttle the SoC.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

The Processor Throttle Control Indication (PTCI) signal (or pin) of the SoC can be implemented as a single bi-directional or two independent input and output signals. The bi-directional signal reduces pin count. In the output mode, the SoC on die junction temperature over limit is triggered to the system components such as fan and/or serial voltage identification (SVID) rails to take appropriate evasive actions. Similarly, the input mode is utilized when there are changes in system power delivery, and low battery conditions to indicate the SoC to take throttling (e.g., decrease or increase SoC performance frequency) actions.

System Power availability changes when, for example, (i) platform charger power source is disconnected resulting in loss of available power, (ii) providing power to an external self-powered peripheral (e.g., a Universal Serial Bus (USB) peripheral), and (iii) Type-C power role reversal from Sink to Source (e.g., where the system delivers power to external devices).

In some embodiments, SoC throttling and platform power control action modes are managed by a centralized throttling software. PTCI signal of the SoC triggers throttling software to take appropriate corrective actions based on available power budget and TDP.

SoC in computer systems can be appropriately throttled based on available power budget based on battery capacity. throttling can be triggered when a charging power source is disconnected due to loss of available additional external power. Similarly, SoC throttling mechanism is applied when the system changes its power role from sink to source as the available battery capacity is also utilized to power attached peripheral bus powered devices.

Power demand changes are caused by, for example, SoC applications and other peripheral device enumeration when the system is residing in static source or sink modes at the USB Type-C Port. When an external charger power source is connected or disconnected, there is a net change in power availability to the SoC and platform, which is utilized for performance optimization. Similarly, many bus powered peripherals consume power from the system battery causing a decrease in net energy availability to the SoC. Hence the SoC recalibrates SoC power demand, based on energy availability, in accordance with various embodiments. This helps to avoid uneventful system shutdown due to battery overload while extending battery life. The mechanism of various embodiments also optimizes SoC scaling to performance rapidly for user experience.

Existing systems detect charging power source presence and absence by the VBUS rail coming from the USB Type-C connector. Platform devices and firmware detect the rising/falling VBUS voltage transition against a comparator threshold which could trigger the PTCI signal to the SoC. However, there is a significant delay from the time VBUS presence/absence detection to executing the necessary SoC throttling decision due to: (a) low charge decay in VBUS caused by large capacitors on the VBUS rail; and (b) significant latency due to hardware and corresponding firmware response to trigger the PTCI signal to the SoC.

USB Type-C docks require a fast power role reversal when the docks lose power. The SoC system is expected to reverse power role and deliver power instantaneously (e.g., 150 us from vSafe5V falling threshold) to the dock while maintaining user experience with available battery capacity. The PTCI should be instantly delivered to take necessary SoC action when charging source dock loses power. However, relying on VBUS decay causes delay in throttling the SoC immediately and will stress the battery resulting in ungraceful shutdown. So, migration to Type-C chargers use time stringent power role reversal from Sink to Source, and hence relying on VBUS removal detection may not be a preferred option.

Industry migration to USB Type-C chargers provide multiple power sources to the SoC platform which are 5V sources with 2.5 W, 4.5 W, 7.5 W and 15 W capacity. Above 15 W, the chargers can deliver power up to 100 W with various source voltage in specified power ranges by Port controller firmware. The existing charger VBUS removal does not provide the exact power loss for SoC to throttle proportionally.

Energy loss is a concern when VBUS powered peripheral devices are connected while the system is sourcing or sinking power from a charger. The legacy VBUS solution does not quantify this for SoC and Platform throttling actions proportionally. Further, VBUS removal detection solution causes more head room to be designed in platform throttling with a higher guard band.

USB Type-C power delivery (PD) standard specifies charging sources with a range of power delivery capacity. Today's existing simple PTCI signal does not quantify the level of throttling scale to fine grain steps proportional to the various ranges of power delivery. Currently, there is no specific communication channel from platform to the SoC to help scale the throttling frequency level to a finer resolution with respect to net power change availability to the SoC and System. Currently, there is no low latency solution today to notify SoC when there is a net change in power delivery.

Some embodiments provide a low latency PTCI signal with preemptive power connect-disconnect indication, power loss or gain detection, and net quantified energy availability to the SoC and system. The mechanism of various embodiments helps with power and battery design, while boosting SoC performance and user experience. The optimized solution of various embodiments leads to next generation smart electronic devices balancing power and performance.

The architecture framework of various embodiments utilizes the specifications of USB Type-C and PD. Based on an external charger connection or disconnection, a low latency fine grain power budget loss or gain indication to the SoC is delivered. The mechanism of various embodiments is also applicable to connection or disconnection of VBUS powered peripheral devices to the system. The net power loss or gain available to the SoC and System is proportionally used to scale the SoC throttling.

The mechanisms of various embodiments enable more headroom for platform board designers to use less expensive components. The mechanisms of some embodiments utilize the available Power Management Integrated Circuit (PMIC) or discrete silicon functionality on the platform and makes use of the USB Type-C and PD specification standard protocols.

The mechanisms of some embodiments accomplish low latency throttle hints to the SoC via software or power management controller based on energy availability to SoC. In some embodiments, battery power budget hints to the SoC to scale performance proportionally. In some embodiments, charger connection and its power delivery capability to the SoC to scale its performance proportionally. In some embodiments, charger disconnection and the equivalent loss of power to the SoC to scale down the performance proportionally. In some embodiments, power loss to the SoC is quantified on connecting a peripheral device that consumes the available power budget. In some embodiments, power loss or gain is quantified when a USB Type-C port reverses power role from consumer to source and vice versa to scale SoC performance down or up proportionally.

The hardware of some embodiments provides a low latency pull-down impedance (Rd) voltage over time detection comparator which determines connection or disconnection on a USB Type-C port and generates one or more throttle signals (e.g., PTCI signals) for the SoC. In some embodiments, PD logic has an inbuilt comparator which can be used to trigger throttling in SoC shown. The software of some embodiments detects specific PD Protocol Packets and generation of SoC Throttle Hints on new power contracts and power reversals on a USB Type-C Port. The software of some embodiments utilizes the system fuel gauge device to determine fine grain accurate power loss or gain on connecting a peripheral or charger to a USB Type-C Port.

In some embodiments, hardware and software trigger methods for fine grain throttling. The solution transitions from hardware to software methods as the USB Type-C Port Negotiation Protocol changes from implicit (also PD less) to explicit contract when applicable. In the hardware scheme, CC Rd voltage threshold is utilized for the USB Type-C Charger Disconnect detection instead of the VBUS, in accordance with some embodiments. In some embodiments, a programmable voltage threshold is used for CC detection comparator coupled with Port Controller/PD firmware sequence to instantly deliver PTCI while quantifying the power budget loss based on the type of charger disconnect. Some embodiments are applicable for hardware-based detection without PD protocol where power contact happens implicitly. The software trigger method of some embodiments uses the final protocol packet status immediately after power role swap, or power delivery level changes to trigger PTCI to adjust the power loss or gain.

There are many technical effects of the various embodiments. For example, in the hardware method a configurable voltage threshold comparator detection delivers PTCI to SoC on Charger disconnect or connect. The complimentary software trigger method provides a low latency and fine grain detection of power budget change. The solution of various embodiments provides instant low latency scaled fine grain throttling to the SoC and the platform. This optimizes battery life, Performance, facilitates low cost bill-of-materials while enhancing user experience. The mechanism of some embodiments use a fuel gauge algorithm to accurately trigger on measurements of change in power loss or gain with battery energy at the exact time instant devices are connected or disconnected from the system. This provides a quantified value to initiate a proportional throttling to the SoC with the help of a throttling driver software. Other technical effects will be evident from the various figures and embodiments.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Figure 1A:
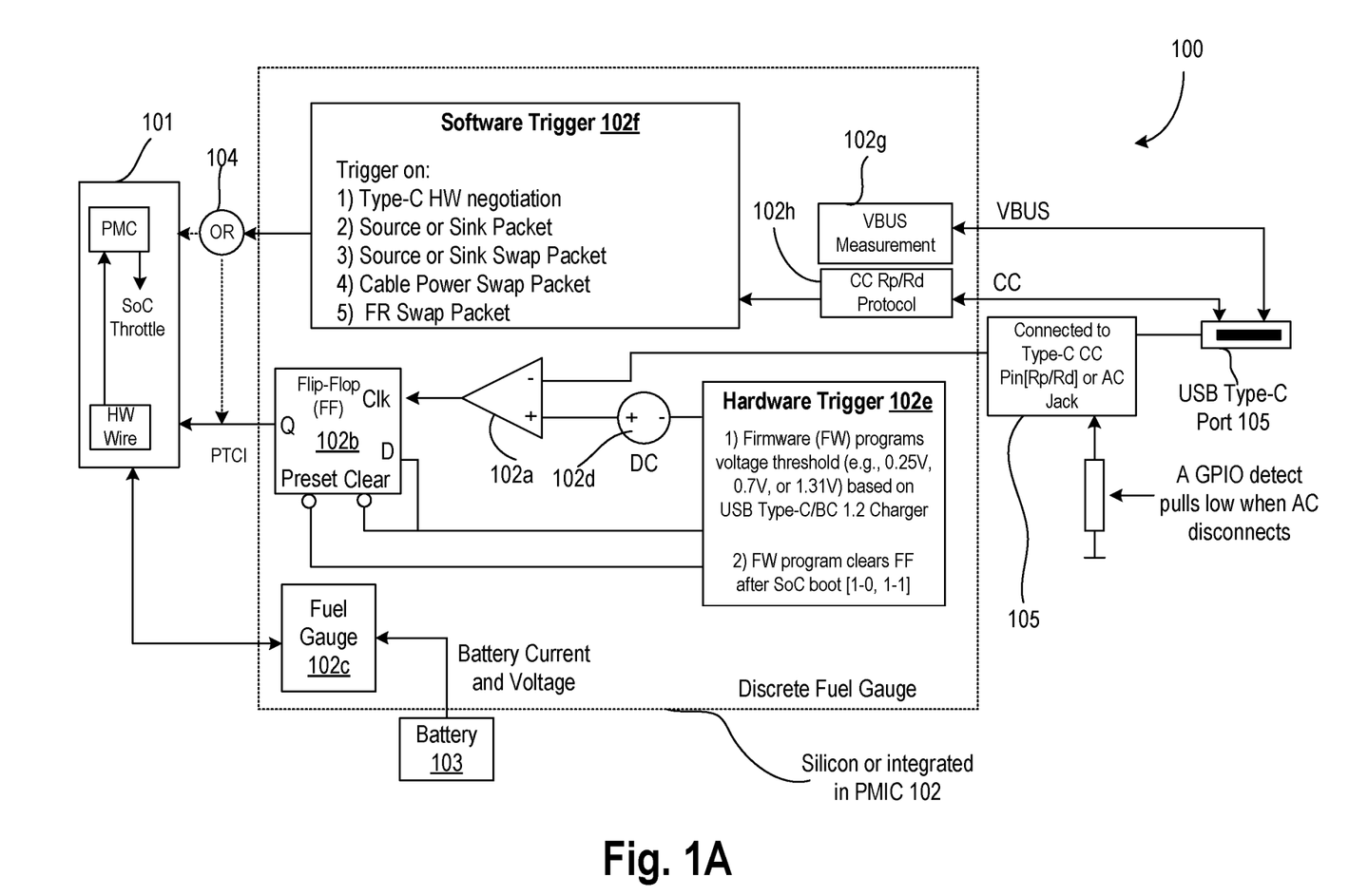
FIG. 1A illustrates an apparatus showing hardware and corresponding software trigger for fine grain low latency throttling of a processor, in accordance with some embodiments of the disclosure.

FIG. 1A illustrates apparatus 100 showing hardware and corresponding software trigger mechanisms for fine grain low latency throttling of a processor, in accordance with some embodiments of the disclosure. Apparatus 100 (or platform 100) comprises processor or SoC 101 having power management controller (PMC) and other logic (e.g., processor cores, cache, graphics processing unit, memory, communication interfaces, etc.). One example of SoC 101 is described with reference to FIG. 5.

Referring back to FIG. 1A, apparatus 100 comprises circuitry 102 (e.g., PD integrated circuit (IC) or part of power management integrated circuit (PMIC) 102), battery 103 (e.g., Li-ion battery), logic OR function 104, USB Type-C CC pin 105 coupled to pull-down impedance (Rd) and/or pull-up impedance (Rp) or AC jack, and USB-Type-C port 104. Circuitry 102 includes hardware comparator 102$a$, flip-flop or sequential unit or sequential circuitry 102$b$, fuel gauge 102$c$, DC offset 102$d$, hardware trigger logic 102$e$ (also referred to as hardware firmware), software trigger logic 102$f$, VBUS measurement logic 102$g$, and CC Rp and/or Rd protocol logic 102$h$ coupled as shown. In some embodiments, a firmware is provided to clear the throttle indication after the processor boots. While the embodiments illustrate flip-flop 102$b$, flip-flop 102$b$ can be replaced with any suitable sequential circuitry (e.g., set-reset latch, D-flip-flop, scan based flip-flop, edge triggered latch, etc.).

In some embodiments, comparator 102$a$ is programmable. For example, one of the inputs (e.g., +input) is adjusted by hardware trigger logic 102$e$ by introducing DC offset 102$d$ to the input of comparator 102$a$. In some embodiments, comparator 102$a$ comprises an amplifier (single-stage or multiple stage amplifier). In some embodiments, when SoC 101 is out of reset and the port controller/PD firmware 102$e$ is ready, it scans PD or PMIC 102 support silicon registers to check the type of USB Type-C charger connected to port 105. USB Type-C 2.0 specification provides three voltage thresholds (e.g., 0.25V, 0.7V, 1.31V) by resistor termination on CC pin 105 for various chargers as illustrated by Table 1.

TABLE 1

| Detection | Minimum Voltage | Maximum Voltage | Threshold |
|---|---|---|---|
| VRa | −0.25 V | 0.15 V | 0.2 V |
| VRd-Connect | 0.25 V | 2.04 V | |
| VRd-USB | 0.25 V | 0.61 V | 0.66 V |
| VRd-1.5 | 0.70 V | 1.16 V | 1.23 V |
| VRd-3.0 | 1.31 V | 2.04 V | |

VRd-USB is for Type-C host charger of 4.5 W, VRd-1.5 is for Type-C charger or dock or legacy BC1.2 with 7.5 W, VRd-3.0 is for Type-C charger or dock with 15 W. Chargers beyond 15 W that are attached to port 105 are negotiated by PD protocol listed in Table 2 and protocol status is used by the software implementation.

TABLE 2

| Mode of Operation | Nominal Voltage | Maximum Current | Notes |
|---|---|---|---|
| USB 2.0 | 5 V | As defied by USB 2.0 | |
| USB 3.0 | 5 V | As defined by USB 3.1 | |
| USB BC 1.2 | 5 V | Up to 1.5 A | Legacy charging |
| USB Type-C current at 1.5 A | 5 V | 1.5 A | Supports higher power devices |
| USB Type-C current at 3.0 A | 5 V | 3 A | Supports higher power devices |
| USB PD | 0.70 V | 1.16 | 1.23 |

The software trigger mechanism 102$f$ is used after SoC 101 is out of reset and the Port Controller/PD Firmware (FW) 102$e$ is executing. There are two modes from system power budget perspective. These two modes are power source and power sink. In the power source mode, when a peripheral is connected, or a charger power role swap is completed, a net power loss to the system occurs. In the power sink mode, a charger is connected which is a net power gain to the system. In some embodiments, logic OR function 104 provides throttle trigger by one or both of hardware firmware mechanism 102$e$ or software mechanism 102$f$.

When a USB Type-C peripheral device is connected the System Host Port 105, Controller and/or PD Firmware 102$f$ can trigger Fuel Gauge 102$c$ at CC debounce to capture the power drawn by the device limited by current range with respect to a drop in pull-down impedance Rd voltage (VRd).

The trigger to SoC 101 can be routed directly or via an embedded controller (EC). Any step change in current based on device current consumption can be read by Fuel Gauge 102c at the instant of connect to port 105 and provided to SoC 101 for proportional throttling.

Later when a PD contract (e.g., power delivery contract) is negotiated with a port partner (e.g., source or sink), net power level gain/loss can be measured by Fuel Gauge 102c synchronized to PD packet transfers. This is based on various role scenarios that USB Type-C Port controller/PD firmware executes.

For the Type-C Sink/Consumer role for a SoC system, the proposal for the PD FW to trigger SOC 101 (e.g., SOC FW/DTT FW algorithm to read PD/EC status) are based on the sequence of packets: a) end of Request Data Object (RDO) packets from the SoC 101, and b) reception of acceptance followed by PS_RDY from the port partner (e.g., Charger). This is referred as Sink Packet Trigger. Similarly, the source packet trigger (e.g., power loss to SoC System) is a sequence of packets: a) RDO reception packet, and b) Transmission of Accept followed by PS_RDY by the SoC system. Type-C Power role swaps use a set of packet exchanges. Various embodiments provide a trigger to SoC 101 at the end of sequence of packets which is an indication for SoC 101 to reverse the power role.

The sequence of packets that the PD FW provides to trigger SoC101 are: a) Accept transmission, followed by b) PSTransitionTimer start, followed by c) a reception of PS_RDY and detection of vSafeOV. This is applicable for a SoC system swapping to a source or provider role resulting in power loss. When SoC 101 is turning to a Sink, the reverse sequence applies for a PD to trigger SoC 101. That reverse sequence includes: d) Accept transmission, followed by e) PSTransitionTimer start, followed by e) discharge and detection to vSafeOV, followed by f) delivery of PS_RDY, followed by f) vSafe5V detection resulting in power gain. These will be referenced as Source Swap packet trigger (a) to (c) and Sink Swap packet trigger (d) to (f).

Similarly, for a Cable Power VCONN swaps, in some embodiments for PD FW to trigger SoC 101, the sequence includes g) Accept packet followed by h) VCONNOnTimer start, i) SoC PD FW to VCONN source followed by j) PS_RDY delivery resulting in Power loss. This is referred as Cable Power Swap packet. For the Fast Role (FR) Swap, PD FW in the SoC system trigger SoC 101 to read PD and embedded controller status based on the sequence k) FR Swap Signal CC resistance, time defined in Type-PD 3.0 Specification followed by l) SoC system driving and detecting vSafe5V resulting in a power loss. This is referred as FR Swap Packet. Apart from the PD FW, the hardware voltage time sampling comparator 102a of various embodiments can accomplish the FR Swap Signal detection. By combining hardware and software method of various embodiments, low latency and fine grain power throttling can be achieved by SoC 101.

Figure 1B:
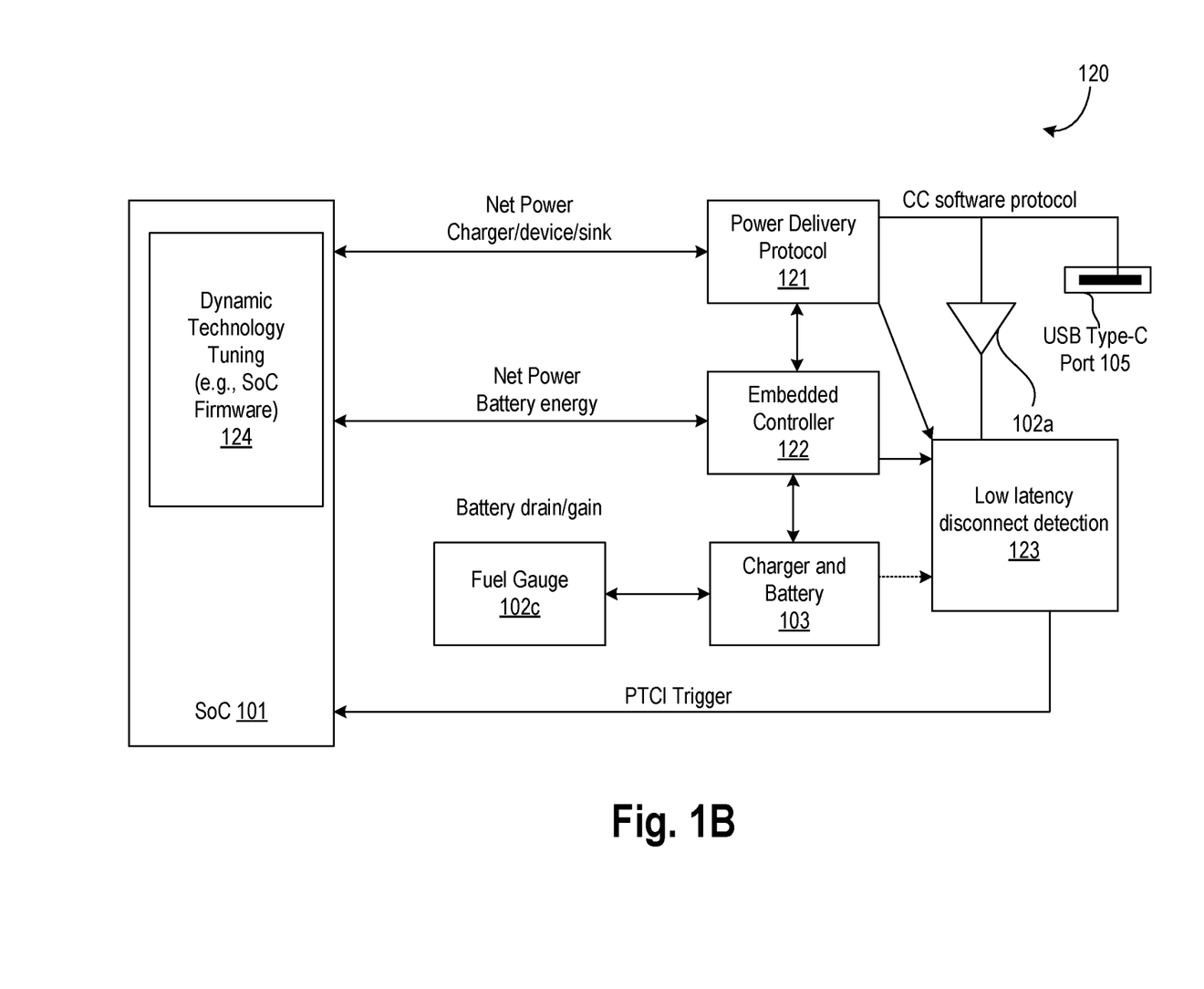
FIG. 1B illustrates an apparatus showing hardware and corresponding software trigger for fine grain low latency throttling of a processor, in accordance with some embodiments of the disclosure.

When the system is out of reset, the port Controller/PD Firmware 102e executing on PD or PMIC 121 in FIG. 1B detects the type of charger connected to port 105. In FIG. 1A, the Port Controller/PD Firmware 102e first clears the output of flip-flop 102b to 0 with PRESET=1 and CLEAR=0. The output of the flip-flop is the throttle indication. The output of comparator 102a samples a data input of flip-flop 102b. Based on the charger type detection, firmware (FW) updates the information to the power throttling driver of SoC 101 about the power budget loss on a potential disconnection.

Next, port controller FW 102e programs the appropriate voltage threshold for comparator 102a based on the type of charger connection detected. Finally, the PRESET and CLEAR is set to 1 to trigger a PTCI if the appropriate connected charger is disconnected. This implementation enables a low latency detection at the instant of disconnection of power source with power budget capacity net loss information provided to SoC 101 to take proportional throttling.

This implementation helps in Type-C fast power role swap. The low latency instant detection of charger hub power removal can trigger SoC 101 instantly to throttle to a prior recorded power budget loss thus not discharging the VBUS and maintaining vSafe5V. This provides timely head room to the SoC firmware in SoC 101 on the indication of source role, on FR (fast role) or power role swap. This results in device being connected and functional during swap enhancing user experience.

Apart from Type-C specified pull-down impedance Rd Voltage (VRd) thresholds, the implementation of various embodiments can set other arbitrary thresholds based on the PD protocol power negotiation for throttling indication in hardware mode.

Triggers for software mechanism 102f are listed in FIG. 1A and applicable to PD related chargers, hubs, and devices. These triggers are: 1) Type-C hardware (HW) negotiation, 2) source or sink Packet, 3) on a power swap packet, and 4) Cable Power Swap packet 5) FR Swap Packet. In case of triggering on Type-C HW negotiation, CC debounce and Rd Termination voltage is used to determine a connection and partner source or sink role. The trigger makes SoC 101 to read the status of PD 121, EC 122 (of FIG. 1B) and Fuel gauge 102c register to use in the DTT tuning algorithm 124 of FIG.-1B.

Initially on connect CC packet debounce, pull-down Rd voltage threshold drop is detected. Next, when Type-C PD Protocol PDO (Power Data Objects) packets are exchanged between port partners, key packet handshakes are used for triggering power budget detection leading to proportional scaled throttling. At these handshake instants, PTCI is delivered to SoC 101 for the first level of throttling while Fuel Gauge Battery Voltage and Current reading is triggered to monitor net power energy gain/loss. This will log the power drain from the platform battery 103 due to the new role of the platform configured as a source.

Any device enumeration on the platform will consume power. This causes a step change in power loss immediately after PTCI is sent to SoC 101. The firmware Packet trigger scheme will average the step power consumption till just after the enumeration of the device and provide the step fine grain power budget (e.g., VBUS*Fuel-Gauge average Step Current) loss for SoC 101 to get ready for next level of proportional fine grain throttling. The solution of some embodiments uses existing hardware and infrastructure to implement the algorithm. Some hardware setup is already present in the system and since the firmware monitors port 105 through PD protocol, it can trigger events from connect for the power measurement algorithm by Fuel Gauge 102c.

Hence forth, while the platform is configured as a source, any activity on the Type-C port 105 such as a new device connection results in a step power loss which is captured by Fuel Gauge 102c that can be logged. Power budget loss can be communicated to the SoC throttling algorithm for corrective action as well as power loss hints for future SoC actions. The power measurement and the power loss hints to SoC 101 can be triggered at the exact instant of PD packet handshake (e.g., software triggers 102f) with the port partner causing net power delivery changes.

In some embodiments, SoC firmware or a Dynamic Technology Tuning (DTT) algorithm maintains a table of dynamic entries of devices connected and enumerated and on devices disconnected based on the trigger sequences received due to connect disconnect at Port 105. The equivalent power budget loss/gain can be subtracted/added from/to the table and communicated back to the SoC Throttling driver. While Fuel Gauge 102c measures power of battery 103, the VBUS measurement 102g is usually accomplished by a PD logic or an embedded controller. VBUS power is consumed by SoC 101 and for battery 103 charging.102h and 105 are connected to the same wire. 105 shows the pull-down impedance vRd voltage that is time sampled by the comparator 102a for a disconnect debounce while the PD Protocol is transmitted by 102h to be processed by the Firmware 102f running in on the PD logic.

Figure 2:
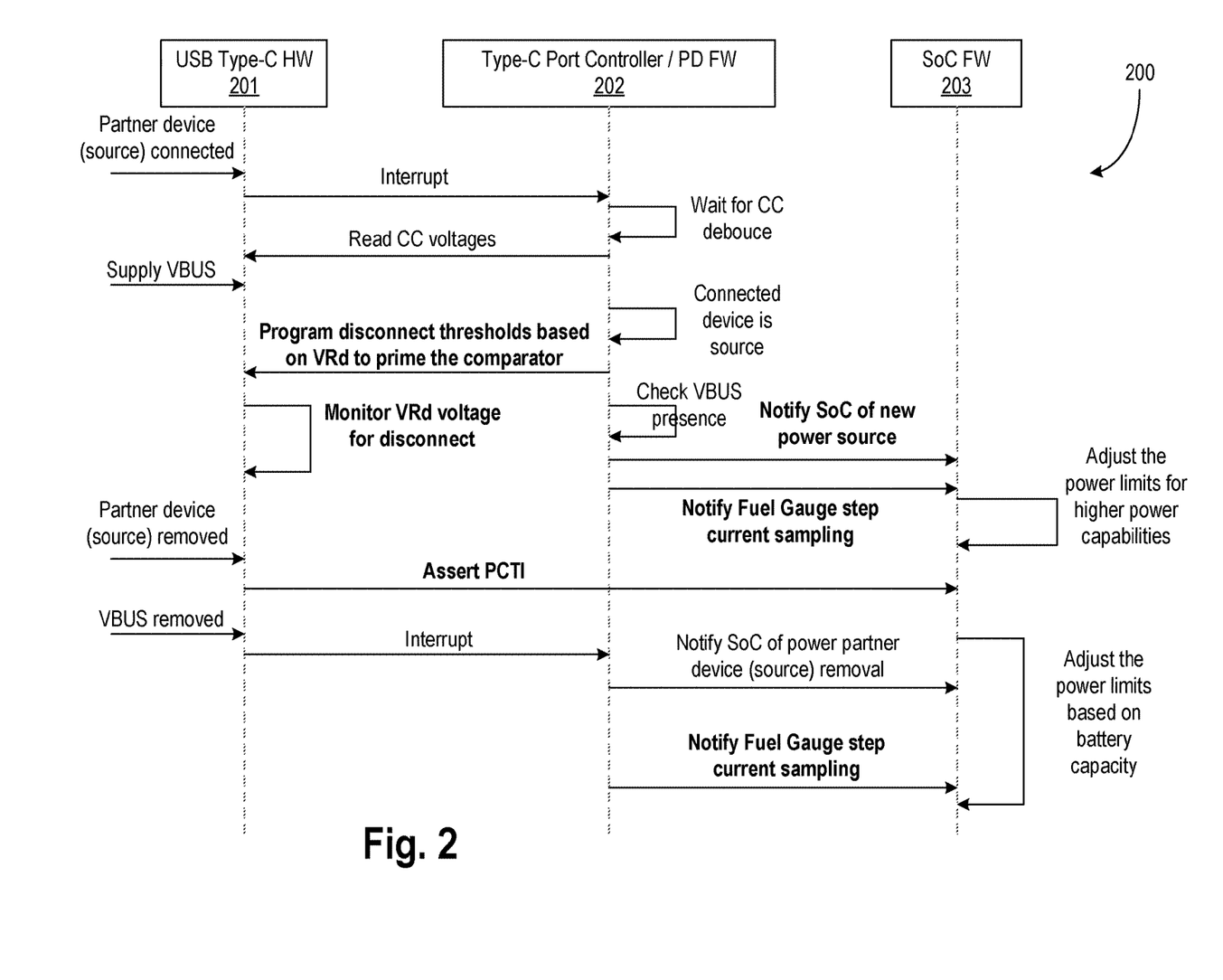
FIG. 2 illustrates a protocol between USB Type-C hardware, USB Type-C port controller and PD firmware, and processor firmware when partner is a source, in accordance with some embodiments of the disclosure.
Figure 3:
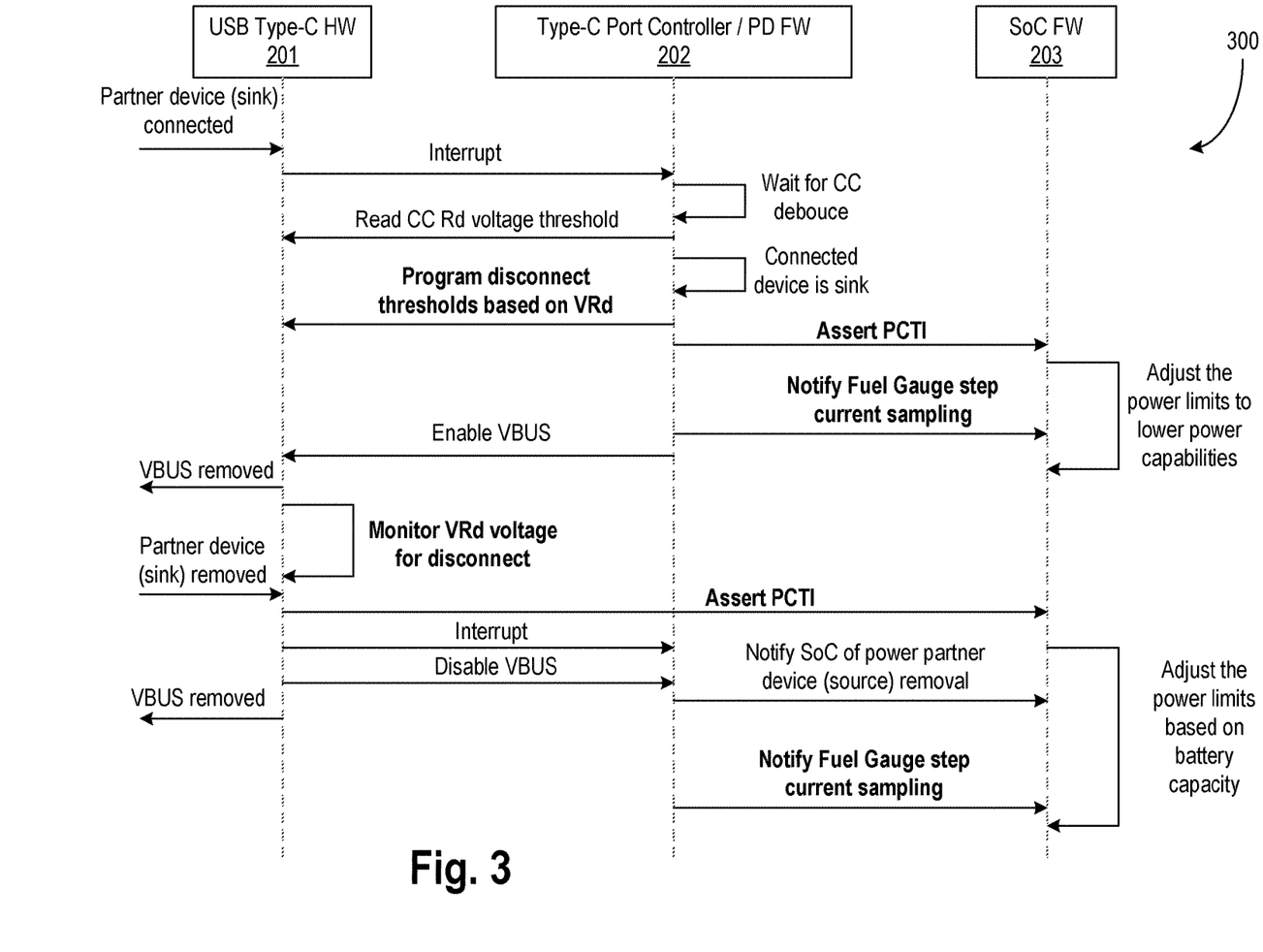
FIG. 3 illustrates a protocol between USB Type-C hardware, USB Type-C port controller and PD firmware, and processor firmware when partner is a sink, in accordance with some embodiments of the disclosure.
Figure 4:
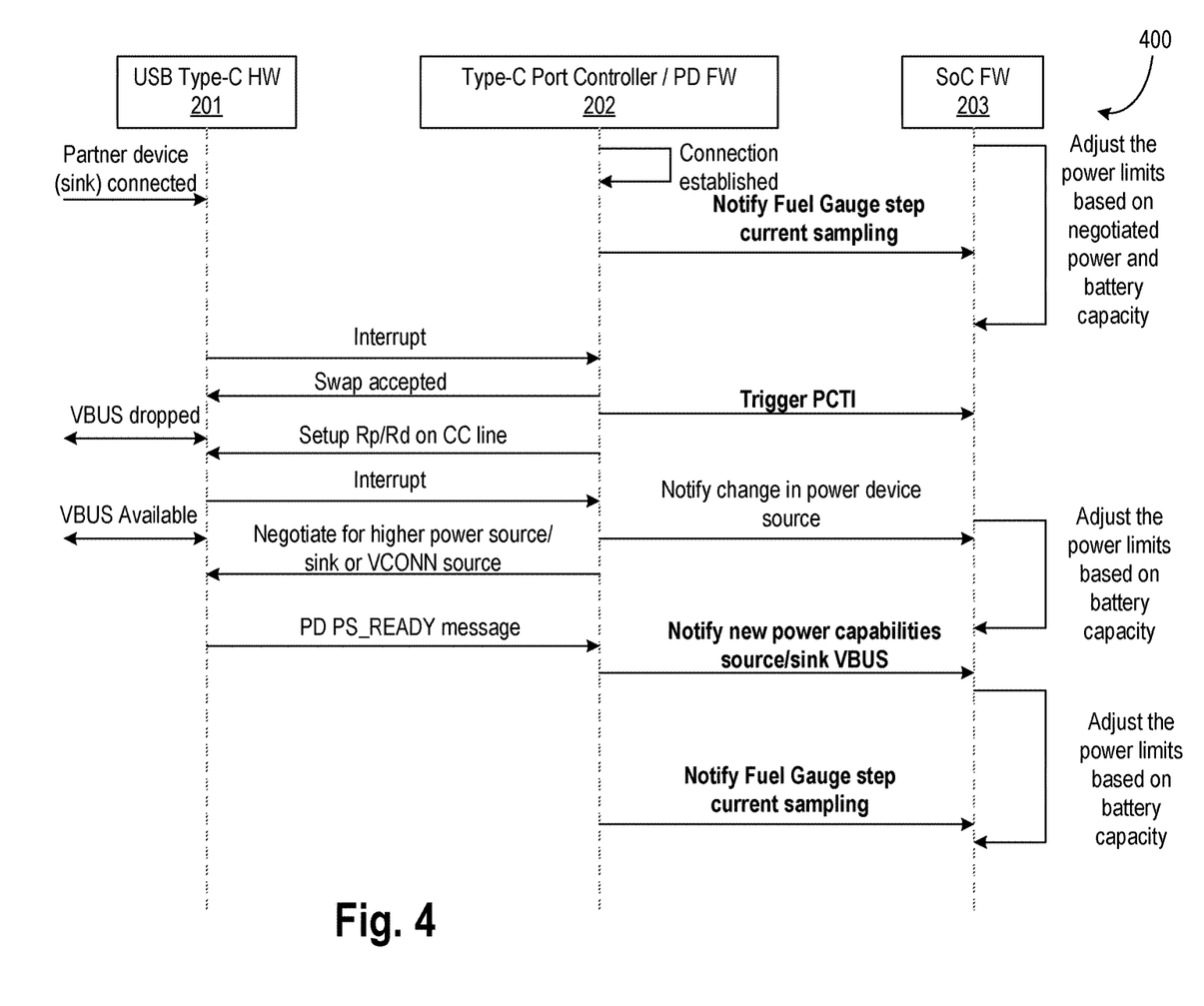
FIG. 4 illustrates a protocol between USB Type-C hardware, USB Type-C port controller and PD firmware, and processor firmware when source and sink power roles are swapped, in accordance with some embodiments of the disclosure.

FIG. 1B illustrates apparatus 120 showing hardware and corresponding software trigger for fine grain low latency throttling of a processor, in accordance with some embodiments of the disclosure. Apparatus 120 is another abstraction of apparatus 100. In some embodiments, the power delivery protocol as described with reference to FIGS. 2-4 are implemented by power deliver protocol logic 121. In some embodiments, an embedded controller (EC) 122 performs the software trigger mechanism 102f and/or also provides battery parameters (e.g., battery drain, gain, energy) from fuel gauge 102c and charger/battery 103 to Dynamic Technology Tuning (DTT) module 124 or firmware of SoC 101. DTT module 124 may be executed by PMC of SoC 101, in some examples. Power delivery controller 121 provides connect/disconnect indications to DTT of SoC 101. In some embodiments, while Fuel Gauge 102c measures power of battery 103, the VBUS measurement 102g is usually accomplished by PD 121 or EC 122.

Type-C port 105 can connect to USB storage device, dock, charger power source, power sink, a device that can reverse source/sink roles. Logic 123 provides low latency disconnect detection which results in triggering PTCI to SoC 101 for fast voltage and/or frequency throttling of SoC 101. In some embodiments, power delivery controller 121 detects VBUS for SoC 101 to read it on a trigger for latency reduction to scale performance throttling rapidly. Fine grain net power budget information is provided to SoC 101 (via power delivery controller 121 and/or embedded controller 122) to proportionally scale SoC throttling voltage and/or frequency rapidly. In some embodiments, comparator 101a and logic 123 comprise hardware to trigger PTCI upon detection of pull-down impedance voltage VRd in implicit power contracts.

In some embodiments, the trigger to SoC 101 is routed directly or via embedded Controller 122. In some embodiments, software mechanism triggers PTCI on power delivery protocol power contract in explicit power contract. The software mechanism also reads Fuel Gauge 102c step power level changes at PTCI trigger events. FIG. 1B shows the aggregation of various interrupt signals from PD controller 121, EC 122, and comparator 102a that are routed to SoC 101 as PTCI Trigger to initiate throttling. SoC DTT 124 or other power management FW may then read PD controller 121, EC 122, and/or Fuel Gauge 102c registers for the parameters mentioned to take necessary throttle action. Note, 105 shows the pull-down impedance voltage vRd that is time sampled by the comparator 102a for a disconnect debounce while the PD Protocol is transmitted by 102h to be processed by the Firmware 102f running in on PD 121.

FIG. 2 illustrates protocol 200 between USB Type-C hardware (HW) 201, USB Type-C port controller and PD firmware 202, and processor (e.g., SoC) firmware 203 when partner is a source, in accordance with some embodiments of the disclosure. The bold text in protocol 200 are added over the exiting protocol between USB Type-C hardware (HW) 201, USB Type-C port controller and PD firmware 202, and processor (e.g., SoC) firmware 203 when partner is a source.

In some embodiments, the solution to incorporate hardware trigger 102e can be built in PD 121 or EC 122 or even the SoC 101 FW. SoC firmware 203 can be any agent in SoC 101. In some embodiments, power management controller (PMC) and power management unit control the various intellectual property (IP) blocks of SoC 101. In some embodiments, DTT firmware 124 comprises a driver that receives controls through Advanced Configuration and Power interface (ACPI) methods of platform agents. Here, 201 refers to Port 105 along with the PMIC/PD, CC pins and analog and digital electronics which process pull-down voltage vRd measurements at the same time allows packets to pass through as in 102h in FIG. 1A In this case, the system detects a connected partner device capable of power source, which is a power gain to the platform. The platform utilizes this power to charge the one or more batteries 103 and use it for system power consumption. To maximize the performance, port controller/PD FW 202 triggers PTCI notification to SoC 101 for power gain.

Trigger for SoC notification is immediately after CC debounce state which is an indication that the partner device is connected. Next, the Port controller/PD FW 202 detects pull-down impedance Rd threshold voltage (VRd) and hence will know the available charger power as a power gain to SoC 101 and the platform even before utilizing the power from the partner charger source. Once EC 122 firmware has configured the battery charger, a trigger is provided SoC 101 to read from fuel gauge 102c measurement of the step current consumed for charging battery 103. The DTT firmware of SoC 101 indicates SoC throttling algorithm the amount of power available to SoC 101 (e.g., negotiated charger power subtracted from consumed battery charge power measured by fuel gauge 102c) and can make the necessary throttling versus Battery Charging rate requirement. Firmware can decide if available power has to be drained to Battery charging or SoC throttling for performance.

When the partner device is Type-C power delivery capable, Port controller/PD FW 202 negotiates for the higher power profile. In these cases, the Software Trigger mechanism 102f uses PD Packets handshakes (described with reference to FIG. 1A). The PSTransistionTimer Start (with following Successful PS_RDY), vSafe0V, vSafe5V and VCONNOnTimer Start (with following Successful PS_RDY) packet instances are used to trigger for SoC throttling activities. The Port Controller/PD firmware 202 indicates to SoC throttling algorithm the amount of power available to SoC 101 (e.g., negotiated charger power subtracted from consumed battery charge power measured by fuel gauge 102c) and can make the necessary throttling versus battery charging rate requirement.

During disconnect (e.g., when partner device (source) is removed), Type-C HW 201 triggers PTCI to SoC 101 (or received by SoC FW 203) based on the disconnect thresholds programmed as shown in FIG. 1A. The thresholds are programmed based on a priori information during enumeration of a power source. SoC Firmware 203 knows a priori how much power budget it has lost since the power gain was captured on a partner device connection. SoC 101 is also aware of any alert from comparator 101a and knows to act to that alert immediately.

FIG. 3 illustrates protocol 300 between USB Type-C hardware 201, USB Type-C port controller and PD firmware 202, and processor firmware 203 when partner is a sink, in accordance with some embodiments of the disclosure. The bold text in protocol 300 are added over the exiting protocol between USB Type-C hardware (HW) 201, USB Type-C port controller and PD firmware 202, and processor (e.g., SoC) firmware 203 when partner is a sink.

During connection, if partner device is detected as sink, platform sources the power to the device. SoC 101 receives indication of this net power change with low latency for throttling. Port Controller/PD FW 202 notifies the SoC 101, the power budget loss by triggering at the exact time instance of CC debounce (connect). With a Type-C non-PD connected device, the hardware pull-down impedance Rd voltage (VRd) determines the maximum power that will be drawn. The potential maximum power drained can be communicated to SoC throttling firmware 203 to manage before platform can supply VBUS to the sink device. The step current form fuel gauge 102c can also be monitored at this instant till after device enumeration for logging the exact current consumed by the device. The net power loss from the platform is thus provided as power loss hints to SoC throttling FW 203 when SoC FW reads the information from PD and Fuel Gauge status registers. When the partner device is Type-C PD capable device, Port Controller or PD FW 202 negotiates for the required power and re-triggers notification to SoC PTCI for new power requested by the partner. In these conditions, ACCEPT, PS_RDY and RDO (Request Data Object) handshake packet is used to trigger the maximum power drained by port partner which is used by SoC throttling firmware 203. The step Fuel Gauge current is also measured immediately at PS_RDY handshake to provide the exact power drained as the net power loss to the System. The hint is used by SoC throttling firmware.

During disconnection of the partner device (sink), Type-C HW 201 triggers PTCI to SOC FW 203 based on the disconnect thresholds programmed as shown in FIG. 1A. Type-C FW removes the VBUS upon disconnect and reinstates the power gain equivalent to the absence of power consuming devices while accommodating for battery discharge also read by SoC 101 at the instant of PTCI trigger. The new capacity is communicated to SoC throttling firmware 203.

FIG. 4 illustrates protocol 400 between USB Type-C hardware 201, USB Type-C port controller and PD firmware 202, and processor firmware 203 when source and sink power roles are swapped, in accordance with some embodiments of the disclosure. The bold text in protocol 400 are added over the exiting protocol between USB Type-C hardware (HW) 201, USB Type-C port controller and PD firmware 202, and processor (e.g., SoC) firmware 203 when power sources roles are swapped.

Once the connection is established, the partner initiates VBUS/VCONN swaps. To achieve minimum latency to drive SoC throttling, as soon as Port Controller/PD FW 202 decides to accept the SWAP message, PTCI notification is triggered to SoC FW 203. The trigger handshake packet events are vSafe5V and vSafe0V for a source or sink VBUS respectively. For VCONN, the trigger events, PS_RDY handshake with ACCEPT. SoC FW 203 adjusts the power throttling proportional to FG/Battery depletion capacity and power limits requested by the consumer partner on getting a PTCI trigger and reading the PD status register.

Elements of embodiments are also provided as a machine-readable medium (e.g., memory) for storing the computer-executable instructions (e.g., instructions to implement any other processes discussed herein) also referred to as machine-executable instructions. In some embodiments, the computing platform comprises memory, processor, machine-readable storage media (also referred to as tangible machine readable medium), communication interface (e.g., wireless or wired interface), and network bus coupled together.

In some embodiments, the processor is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks of the system are coupled together via a network bus. Any suitable protocol may be used to implement network bus. In some embodiments, the machine-readable storage medium includes instructions (also referred to as the program software code/instructions) for calculating or measuring distance and relative orientation of a device with reference to another device as described with reference to various embodiments and flowchart.

Program software code/instructions associated with the methods and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with various embodiments are executed by the computing system.

In some embodiments, the program software code/instructions associated with various flowcharts are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

In some embodiments, the method or operation includes: detecting USB Type-C power delivery protocol packets and to generate throttle hints for a processor when a peripheral or charger is coupled to a USB Type-C port; utilizing a fuel gauge to determine fine grain power loss or gain information on connection of the peripheral or charger to the USB Type-C port; and triggering a throttle indication for the processor based on the detecting and utilizing. In some embodiments, the method comprises determining a net power loss or gain available to the processor to proportionally scale the throttle. In some embodiments, the USB Type-C port connects to one of charger power source, USB storage, dock, power sink device, or a device capable of role reversals between source and sink. In some embodiments, the one or more machines comprise a power management integrated circuit, and wherein the processor comprises a system-on-chip.

Tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer-to-peer networks and the like, including the Internet. Different portions of the software program code/instructions and data can be obtained at different times and in different communication sessions or in the same communication session.

The software program code/instructions and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 5:
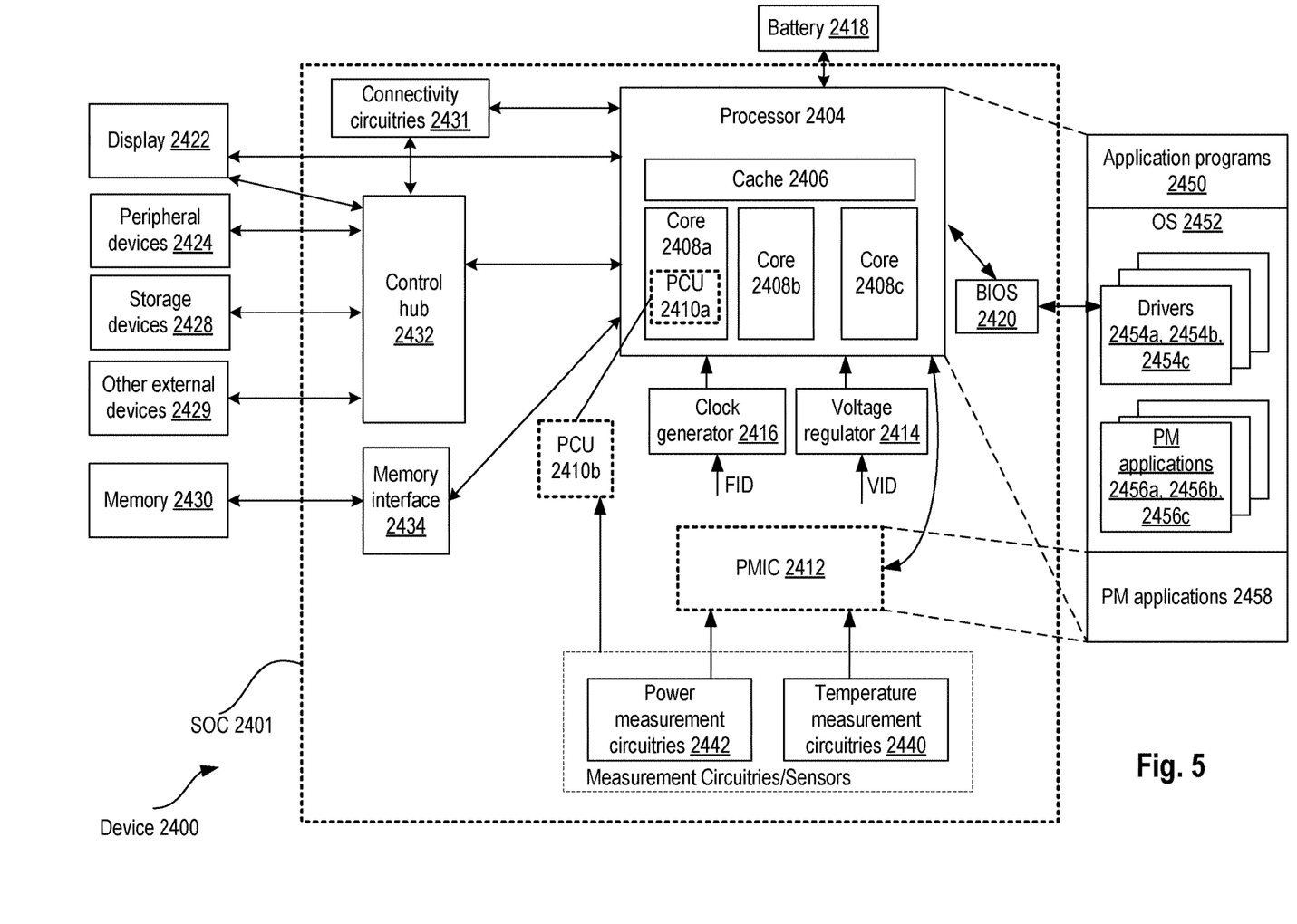
FIG. 5 illustrates a computer system or computing device with mechanisms for low latency fine grain throttling, in accordance with some embodiments.

FIG. 5 illustrates a computer system or computing device with mechanisms for low latency fine grain throttling, in accordance with some embodiments. It is pointed out that those elements of FIG. 5 having the same reference numbers (or names) as the elements of any other figure may operate or function in any manner similar to that described, but are not limited to such. In various embodiments, computer system or computing device includes hardware and software trigger mechanisms from Type C Port or PD Controller to SoC PTCI pin. The hardware trigger mechanism uses CC debounce detection, with a programmable VRd voltage threshold sampling comparator. This implementation provides net change (gain or loss) in default power scale to the computer system for a proportional throttle to SoC at the instant of connection or disconnection. The software trigger mechanism which synchronized with negotiated Port Controller packet, source/sink sub states, indicate SoC PTCI at the exact instant time stamp when power is available or consumed. Following handshake packets PSTransistionTimer, vSafe5V, vSafe0V, VCONNOnTimer, ACCEPT and PS_RDY are used to trigger PTCI to SoC. Both hardware and software triggers are also directed to trigger a fuel gauge device on the platform to measure the real-time power consumption (sink) or source from or to the system battery with a record of available battery energy capacity.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises an SoC (System-on-Chip) 2401. An example boundary of the SOC 2401 is illustrated using dotted lines in FIG. 5, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 5, processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408*a*, 2408*b*, 2408*c*, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410*a/b* and/or PMIC 2412. In some embodiments, each core has a network of distributed LDOs to provide efficient control for power management. The LDOs can be digital, analog, or a combination of digital or analog LDOs. In some embodiments, VR 2414 includes current tracking apparatus to measure current through power supply rail(s).

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System (OS) 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456a, 2456b, 2456c. The OS 2452 may also include various drivers 2454a, 2454b, 2454c, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

In some embodiments, pCode executing on PCU 2410*a/b* has a capability to enable extra compute and telemetries resources for the runtime support of the pCode. Here, pCode refers to a firmware executed by PCU 2410*a/b* to manage performance of the 2401. For example, pCode may set frequencies and appropriate voltages for the processor. Part of the pCode are accessible via OS 2452. In various embodiments, mechanisms and methods are provided that dynamically change an Energy Performance Preference (EPP) value based on workloads, user behavior, and/or system conditions. There may be a well-defined interface between OS 2452 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 2452 by including machine-learning support as part of OS 2452 and either tuning the EPP value that the OS hints to the hardware (e.g., various components of SCO 2401) by machine-learning prediction, or by delivering the machine-learning prediction to the pCode in a manner similar to that done by a Dynamic Tuning Technology (DTT) driver. In this model, OS 2452 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 2452 and the other from software such as DTT, and may selectively choose to provide higher performance and/or responsiveness. As part of this method, the pCode may enable in the DTT an option to tune its reaction for the DTT for different types of activity.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Various embodiments described herein are illustrated as examples. The features of these examples can be combined with one another in any suitable way. These examples include:

Example 1: An apparatus comprising: comparator having a first input coupled to a pull-up or pull-down impedance, and a second input to receive an adjustable threshold; and a sequential circuitry coupled to the comparator, wherein an output of the comparator is to sample a data input of the sequential circuitry, wherein an output of the sequential circuitry is to provide an indicator to a processor to throttle a voltage and/or frequency of the processor.

Example 2: The apparatus of example 1, wherein the pull-up or pull-down impedance is associated with a USB Type-C port.

Example 3: The apparatus of example 2 comprises logic to execute software to detect USB Type-C power delivery pull-down impedance voltage or protocol packets and to generate throttle hints for the processor.

Example 4: The apparatus of example 3, comprises fuel gauge to monitor parameters of a battery, wherein the software is to utilize the fuel gauge to determine fine grain power loss or gain information on connection of a peripheral or charger to the USB Type-C port.

Example 5: The apparatus of example 3, wherein the software is to determine a net power loss or gain available to the processor to proportionally scale the throttle.

Example 6: The apparatus of example 1, wherein the adjustable threshold is based on USB Type-C charger.

Example 7: The apparatus of example 1, wherein the adjustable threshold is adjusted by a firmware.

Example 8: The apparatus of example 7, wherein the firmware is to clear the indicator after the processor boots.

Example 9: The apparatus of example 1, wherein the comparator is a voltage time sampling comparator.

Example 10: A system comprising: a memory; a processor coupled to the memory; a power management integrated circuit coupled to the processor, a wireless interface to allow the processor to communicate with another device, wherein the power management integrated circuit includes: a comparator having a first input coupled to a pull-up or a pull-down impedance of the Type-C CC signal lines, and a second input to receive an adjustable threshold; and a flip-flop coupled to the comparator, wherein an output of the comparator is to sample a data input of the flip-flop, wherein an output of the flip-flop is to provide an indicator to a processor to throttle a voltage and/or frequency of the processor.

Example 11: The system of example 10, wherein the pull-up or the pull-down impedance is associated with a USB Type-C port.

Example 12: The system of example 11, wherein the power management integrated circuit comprises logic to execute software to detect USB Type-C power delivery protocol packets and to generate throttle hints for the processor.

Example 13: The system of example 12, wherein the power management integrated circuit comprises fuel gauge to monitor parameters of a battery, wherein the software is to utilize the fuel gauge to determine fine grain power loss or gain information on connection of a peripheral or charger to the USB Type-C port.

Example 14: The system of example 13, wherein the software is to determine a net power loss or gain available to the processor to proportionally scale the throttle.

Example 15: The system of example 10, wherein the adjustable threshold is based on USB Type-C VBUS Provider or Source.

Example 16: The system of example 10, wherein the adjustable threshold is adjusted by a firmware.

Example 17: The system of example 16, wherein the firmware is to clear the indicator after the processor boots.

Example 18: A machine-readable storage media having machine-executable instructions that when executed cause one or more machines to perform a method comprising: detecting USB Type-C power delivery protocol packets and to generate throttle hints for a processor when a peripheral or charger to is coupled to a USB Type-C port; utilizing a fuel gauge to determine fine grain power loss or gain information on connection of the peripheral or charger to the USB Type-C port; and triggering a throttle indication for the processor based on the detecting and utilizing.

Example 19: The machine-readable storage media of example 18, having machine-executable instructions that when executed cause the one or more machine to perform a further method comprising: determining a net power loss or gain available to the processor to proportionally scale the throttle.

Example 20: The machine-readable storage media of example 18, wherein the USB Type-C port connects to one of charger power source, USB storage, dock, power sink device, or a device capable of role reversals between source and sink, and wherein the one or more machines comprise a power management integrated circuit, and wherein the processor comprises a system-on-chip.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus, comprising:
a comparator having a first input coupled to a pull-up or pull-down impedance which indicates a voltage of a port, and a second input to receive an adjustable threshold;
a port controller to detect when a charger is connected to the port, and a type of the charger, and to provide the adjustable threshold based on the type of the charger, wherein the adjustable threshold indicates a minimum voltage for the detected type of the charger; and
a sequential circuitry coupled to the comparator and the port controller, wherein when a voltage on the first input falls below the minimum voltage, the sequential circuitry is to provide an indicator from the port controller to a processor to throttle a voltage and/or frequency of the processor.

2. The apparatus of claim 1, wherein the port comprises a Universal Serial Bus (USB) Type-C port.

3. The apparatus of claim 1, further comprising logic to execute software to provide an indicator to throttle the processor in response to detection of protocol packets at the port, and to generate throttle hints for the processor.

4. The apparatus of claim 3, further comprising a fuel gauge to monitor parameters of a battery, wherein the software is to utilize the fuel gauge to determine fine-grain power loss or gain information on connection of a peripheral or the charger to the port.

5. The apparatus of claim 3, wherein the software is to determine a net power loss or gain available to the processor to proportionally scale the throttling of the processor.

6. The apparatus of claim 1, wherein the adjustable threshold is adjusted by firmware and the firmware is to clear the indicator after the processor boots.

7. The apparatus of claim 1, wherein the comparator comprises a voltage time sampling comparator.

8. The apparatus of claim 3, further comprising a logical OR function which is to receive the indicator from the port controller and the indicator from the software, and to provide a throttle trigger to the processor to throttle the voltage and/or the frequency based on the indicator received from at least one of the port controller or the software.

9. The apparatus of claim 3, wherein the software is to provide the indicator to throttle the processor in response to detection of protocol packets that indicate a power role swap of the port.

10. The apparatus of claim 3, wherein the software is to provide the indicator to throttle the processor in response to detection of protocol packets that indicate a power delivery level change of the port.

11. The apparatus of claim 3, wherein the software is to provide the indicator to throttle the processor in response to detection of protocol packets that indicate a new power contract with a port partner.

12. A system comprising:
a processor;
a Universal Serial Bus (USB) port; and
a power management integrated circuit coupled to the processor and the USB port, wherein the power management integrated circuit comprises:

a comparator having a first input coupled to a pull-up or a pull-down impedance of CC lines of the USB port, and a second input to receive an adjustable threshold; and a flip-flop comprising a clock input coupled to an output of the comparator, an output coupled to the processor, and a data input, wherein the output of the comparator is to sample the data input of the flip-flop when the output of the comparator indicates a voltage of the first input falls below a voltage of the second input, and the data input comprises an indicator to the processor to throttle a voltage and/or frequency of the processor.

13. The system of claim 12, wherein the USB port is a USB Type-C port.

14. The system of claim 13, wherein the power management integrated circuit comprises logic to execute software to detect USB Type-C power delivery protocol packets and to generate throttle hints for the processor.

15. The system of claim 14, wherein the power management integrated circuit comprises a fuel gauge to monitor parameters of a battery, and the software is to utilize the fuel gauge to determine fine-grain power loss or gain information on connection of a peripheral or charger to the USB port.

16. The system of claim 15, wherein the software is to determine a net power loss or gain available to the processor to proportionally scale the throttle.

17. The system of claim 12, wherein the adjustable threshold is based on a USB Type-C VBUS Provider or Source of the USB port.

18. A machine-readable storage media having machine-executable instructions that when executed cause one or more machines to perform a method comprising:

detecting USB Type-C power delivery protocol packets to generate throttle hints for a processor when a peripheral or charger is coupled to a USB Type-C port;

utilizing a fuel gauge of a battery to determine fine-grain power loss or gain information on connection of the peripheral or the charger to the USB Type-C port, wherein the fine-grain power loss or gain information is proportional to a capacity of the battery; and triggering a throttle indication for the processor based on the detecting and utilizing.

19. The machine-readable storage media of claim 18, wherein the machine-executable instructions when executed further cause the one or more machines to:

determine a net power loss or gain available to the processor to proportionally scale the throttle indication.

20. The machine-readable storage media of claim 18, wherein:

the USB Type-C port connects to one of a charger power source, USB storage, a dock, a power sink device, or a device capable of role reversals between source and sink;

the one or more machines comprise a power management integrated circuit; and the processor comprises a system-on-chip.

* * * * *